United States Patent [19]

Locke et al.

[11] 3,946,486

[45] Mar. 30, 1976

[54] PORTABLE ELECTRICAL SHAVER WITH PIVOTALLY MOUNTED MOTOR

[75] Inventors: David R. Locke, Bridgeport; Edward Szymansky, Fairfield, both of Conn.

[73] Assignee: Sperry Rand Corporation, Bridgeport, Conn.

[22] Filed: June 12, 1974

[21] Appl. No.: 478,714

[52] U.S. Cl. .................... 30/43.92; 310/47; 310/50

[51] Int. Cl.$^{2}$.. B26B 19/28; H02K 5/24; H02K 5/04

[58] Field of Search ............ 30/42, 43.7, 43.8, 43.9, 30/43.91, 43.92, 210; 310/47, 50, 51

[56] References Cited

UNITED STATES PATENTS

| | | | |
|---|---|---|---|
| 3,206,148 | 9/1965 | Longsworth | 310/51 X |
| 3,243,615 | 3/1966 | Jepson | 30/43.92 X |
| 3,349,263 | 10/1967 | Jepson | 310/47 |
| 3,463,954 | 8/1969 | Latta | 310/51 X |

*Primary Examiner*—Al Lawrence Smith
*Assistant Examiner*—Gary L. Smith
*Attorney, Agent, or Firm*—Charles R. Miranda

[57] ABSTRACT

A portable electrical appliance such as an electric dry shaver wherein all the operative elements are mounted on a shroud support assembly for removal as an operative unit from the shaver casing. The support means further include a structural arrangement for permitting the vibratory motor of the appliance to be suspended clear of the casing sidewalls to allow for slight pivotal movement thereof during operation to absorb and reduce vibrations in operation of the appliance.

10 Claims, 10 Drawing Figures

PORTABLE ELECTRICAL SHAVER WITH PIVOTALLY MOUNTED MOTOR

BACKGROUND OF THE INVENTION

This invention relates to new and useful improvements in hand-held portable electric appliances and in particular electric dry shavers.

In presently known electric dry shavers there is usually provided a casing in which is housed an electric motor and upon which casing is provided a cutter head assembly. Drive means are interposed between the motor and cutter head assembly for effecting operation of the cutter head upon energization of the motor by an internal or external power source. It is also required that the casing house not only these mechanisms but other ancillary devices that are found in electric dry shavers such as auxiliary sideburn and moustache trimmers, cutter latching mechanisms and the like.

It is advantageous in these appliances to provide a structural arrangement wherein the various operative parts are disposed for ready access for servicing. In electric dry shavers, for example, it is desirable that the shaver be assembled so that the motor may be removed in operative assembled relationship with the other parts of the shaver from the main protective or enclosure casing. The latter type structure provides for expedient servicing and testing of the shaver.

Various arrangements have been utilized in the past for achieving these objectives and which devices have met with varying degrees of success. Problems are encountered however, in that known arrangements have provided relatively complex structural requirements that do not lend themselves to efficient manufacturing procedures. It is further desirable in certain electric dry shavers which utilize vibratory electric motors that the motor be arranged within the casing in a manner whereby a minimal amount of vibrations are transmitted through the casing walls to the hand of the user during use of the appliance such as disclosed in co-pending application Ser. No. 472,539 filed May 23, 1974 and entitled "Vibrator Motor in Hand-Held Electric Appliance". It has been found that in certain electric dry shavers or other appliances employing these motors (as more fully disclosed in the mentioned application) which comprise an armature pivoted for movement relative to a fixed stator member that the periodic vibrations can be substantially reduced by adjusting the pivot point of the armature within the housing in a manner whereby among other features the lower end of the motor assembly is free to move in a predetermined arc relative to the pivot to balance the armature system and substantially reduce vibrations in use of the appliance.

It is an object of the present invention to provide a novel hand-held electrical appliance and in particular one which houses a vibratory motor and output means operable thereby.

Another object is to provide a novel electric dry shaver wherein means are provided for mounting a shaver motor and cutter head drive means in operative relationship whereby all of the latter elements can be removed from the casing as an operative unit.

A further object is to provide novel means for mounting a vibratory motor within a shaver casing for pivotable movement therein during operation without disturbing or interferring with the adjacent fixed shaver mechanisms.

A further object is to provide a novel means for mounting a cutter head assembly, drive means therefor, and a vibratory motor within a shaver casing whereby the mentioned elements which comprise the operative mechanisms of the shaver can be removed from the shaver casing in assembled operative position and which operative mechanisms may also include a hair trimmer device selectively operative by the cutter head drive means.

A still further object is to provide for an electric dry shaver having an improved structural arrangement which permits efficient and less costly manufacturing and assembly procedures.

The present invention contemplates a novel hand-held electric appliance. In one embodiment the invention is embodied in an electric dry shaver which comprises a cutter head assembly, drive means therefor and a vibratory motor. Support means are provided for supporting the latter elements whereby the latter are removable as a unit from the appliance casing and which means include a shroud support member. Means are provided for mounting the motor on the shroud whereby the one end is free to swing in an arc relative thereto in operation. The support further includes a novel support for the motor stator including strap means suspended from the shroud assembly to interconnect the latter to the stator support.

The above and other objects and advantages of the present invention will appear more fully hereinafter from a consideration of the detailed description which follows taken together with the accompanying drawings wherein an embodiment of the invention is illustrated.

DETAILED DESCRIPTION

Figure 1:
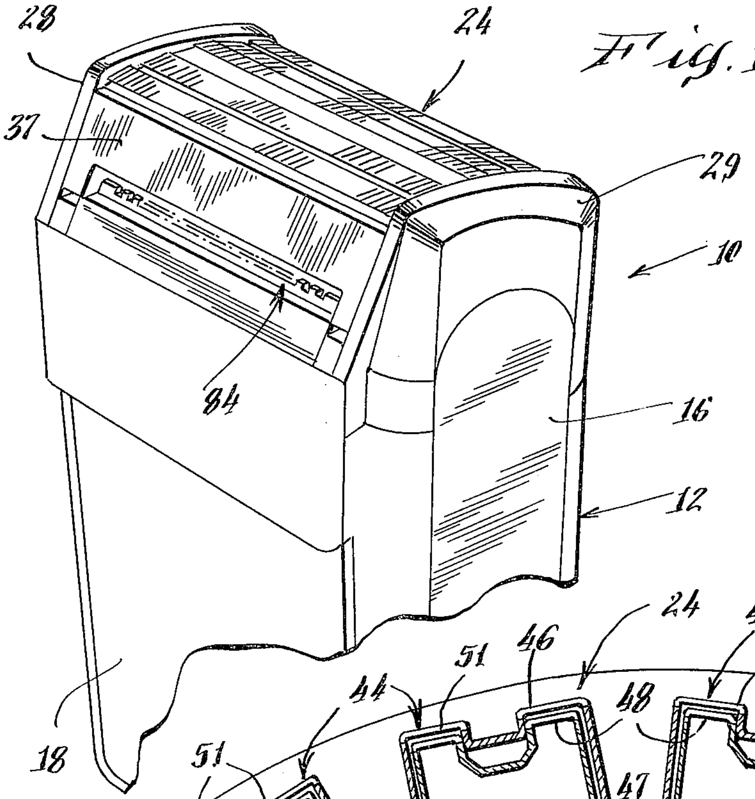
FIG. 1 is a fragmentary perspective view of an electric dry shaver in which is incorporated an embodiment of the present invention.
Figure 2:
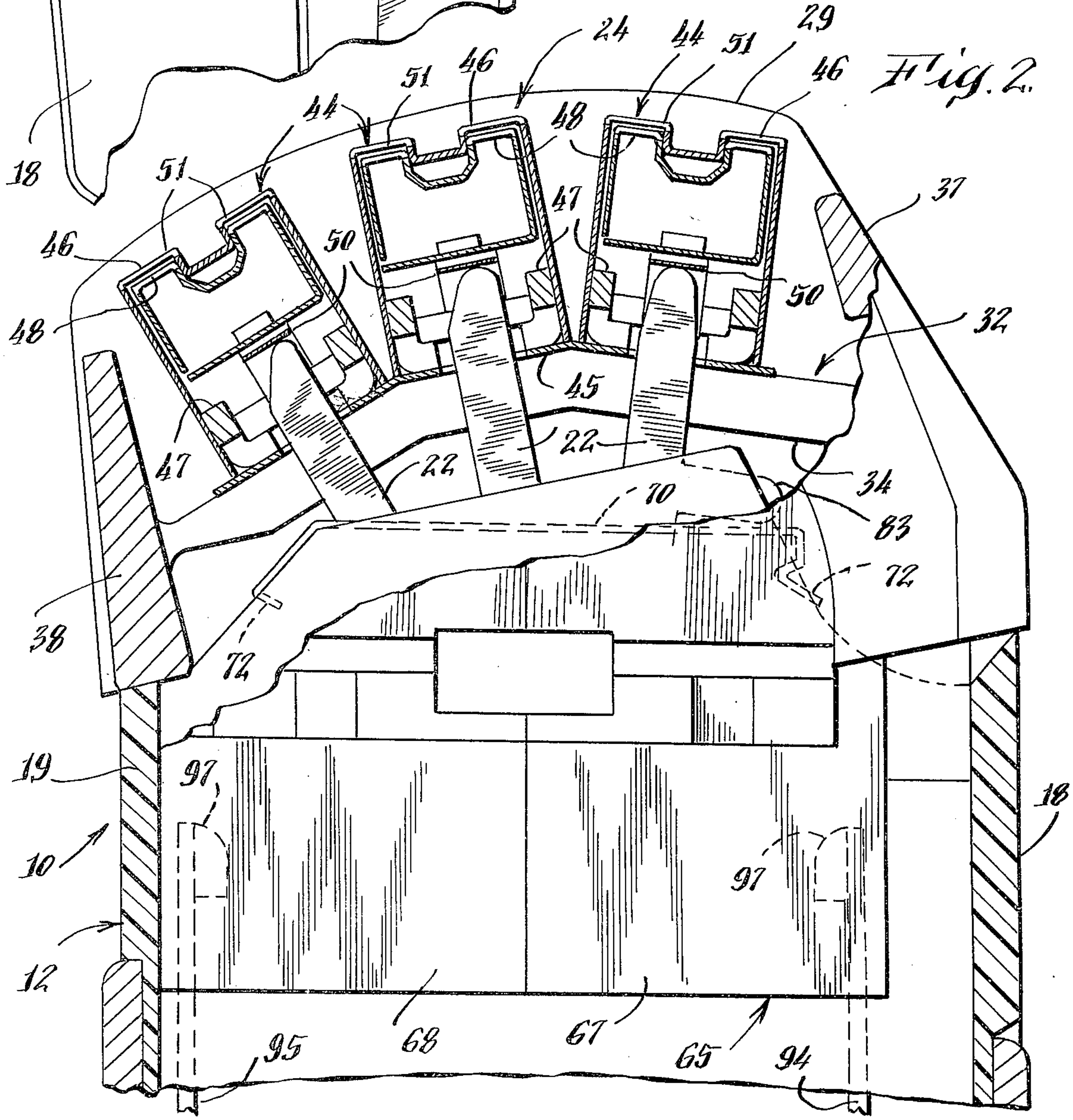
FIG. 2 is a fragmentary side elevational view of the upper portion of the shaver of FIG. 1 and shows portions of the cutter head assembly and cutter head drive means.

Referring now to the drawings for a more detailed description of the present invention and more particularly to FIGS. 1 and 2 in electric dry shaver is generally indicated by the reference numeral 10. Electric dry shaver includes a main enclosure casing 12 of hard molded plastic material and which enclosure includes spaced sidewalls 14 and 16 (FIG. 4) together with a bottom wall 17 and front and rear walls 18 and 19. A vibratory motor 21 (FIGS. 3 and 4) is enclosed within casing 12 in a manner to be hereinafter described in detail and which motor is provided with oscillator arms 22 for operation of a cutter head assembly 24 disposed in the upper portion (FIG. 1) of shaver 10 within a cutter head receptacle 25.

Cutter head receptacle 25 is formed by a pair of end wall pieces 28 and 29 (FIG. 10) which have arcuate-shaped recess portions 30 and 31 seated on the upper arcuate end extensions of sidewalls 14 and 16 of casing 12. A cutter head support section 32 is disposed between end wall piece 28 and 29 and includes a bottom wall 34 and front and rear walls 37 and 38. The lower corners of rear wall 38 (FIGS. 2 and 10) are provided with openings 40 adapted to engage hinge pins 41 (one shown FIG. 10) on end pieces 28 and 29 whereby cutter head supporting section 32 is pivotable about hinge pins 41 into and out of cutter head receptacle 25 away from the main body section 12. Support section 32 is held in a stationary position relative to section 12 by suitable latching mechanisms (not shown) which latchs the front wall 37 of cutter support section 25 to main section 12.

Cutter head assembly 24 as seen in FIG. 2 is of a well-known structure and includes a plurality of individual cutter head units 44 secured in any suitable manner in side by side relationship on a slightly convex rectangular mounting plate 45 which conforms to the surface of bottom wall 34 of cutter support section 32. Each cutter head unit 44 includes an inverted U-shaped outer cutter 46 having the lower wall portions thereof secured to a U-shaped base spacer 47. Inner cutter 48 is provided within each outer cutter 46 and is of the general type described in U.S. Pat. No. 2,793,430 issued on May 28, 1957 to L. C. Carissimi. A leaf spring 50 (partially shown in FIG. 2) is provided for each inner cutter 48 and secured thereto to urge its inner cutter 48 into cutting cooperation with its associated outer cutter 46. Oscillator arms 22 engage leaf springs 50 and upon operation of motor 21 drive the inner cutters 48 in a reciprocating path in a known manner within outer cutters 46 to shear facial hairs that are combed into the hair reception slots 51 in outer cutters 46. Suitable fastening means (not shown) are provided to secure mounting plate 45 to bottom wall 34 of cutter support section 32.

Figure 4:
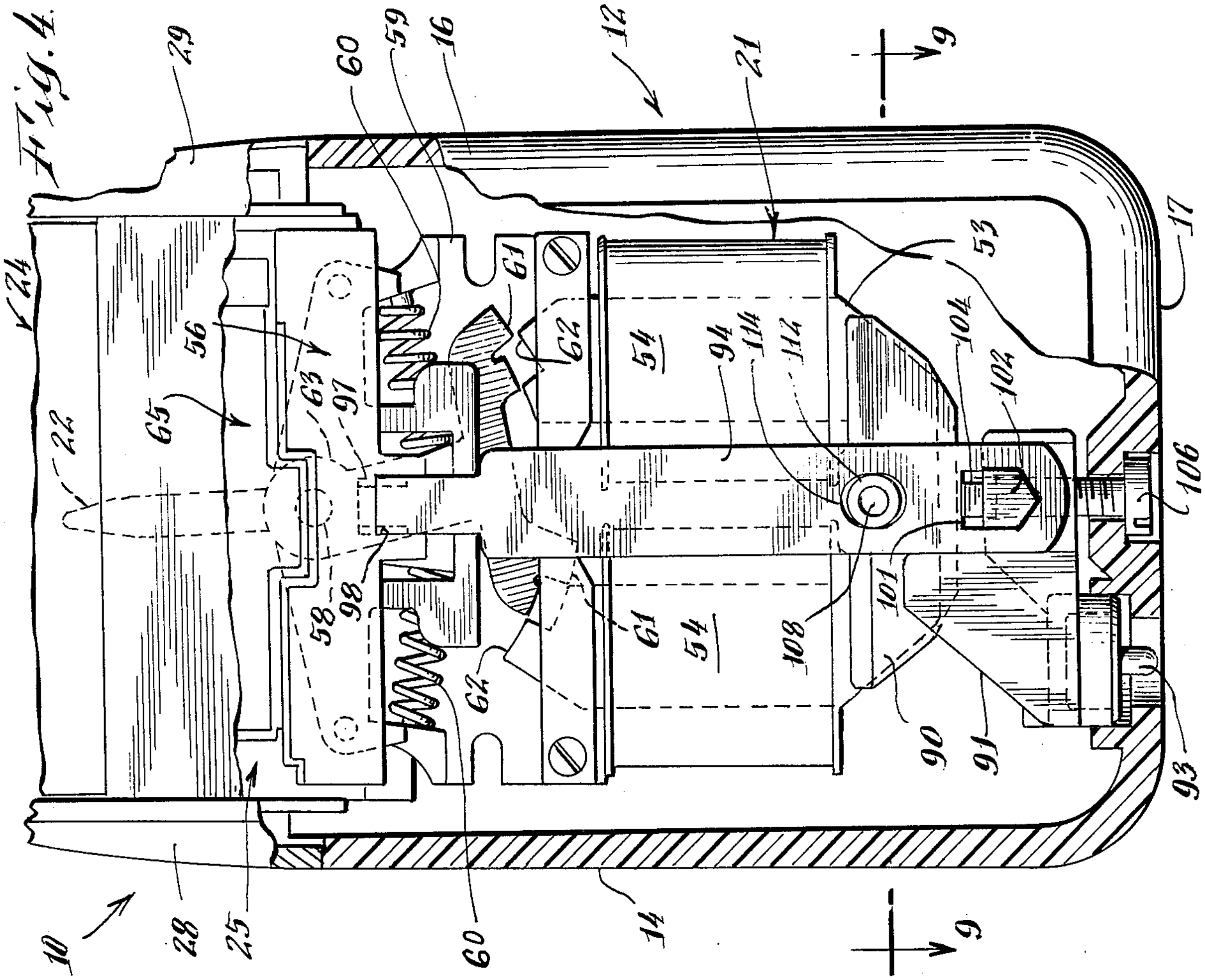
FIG. 4 is a front elevational view of the shaver as seen in FIG. 3 with portions broken away to show the interior thereof.
Figure 3:
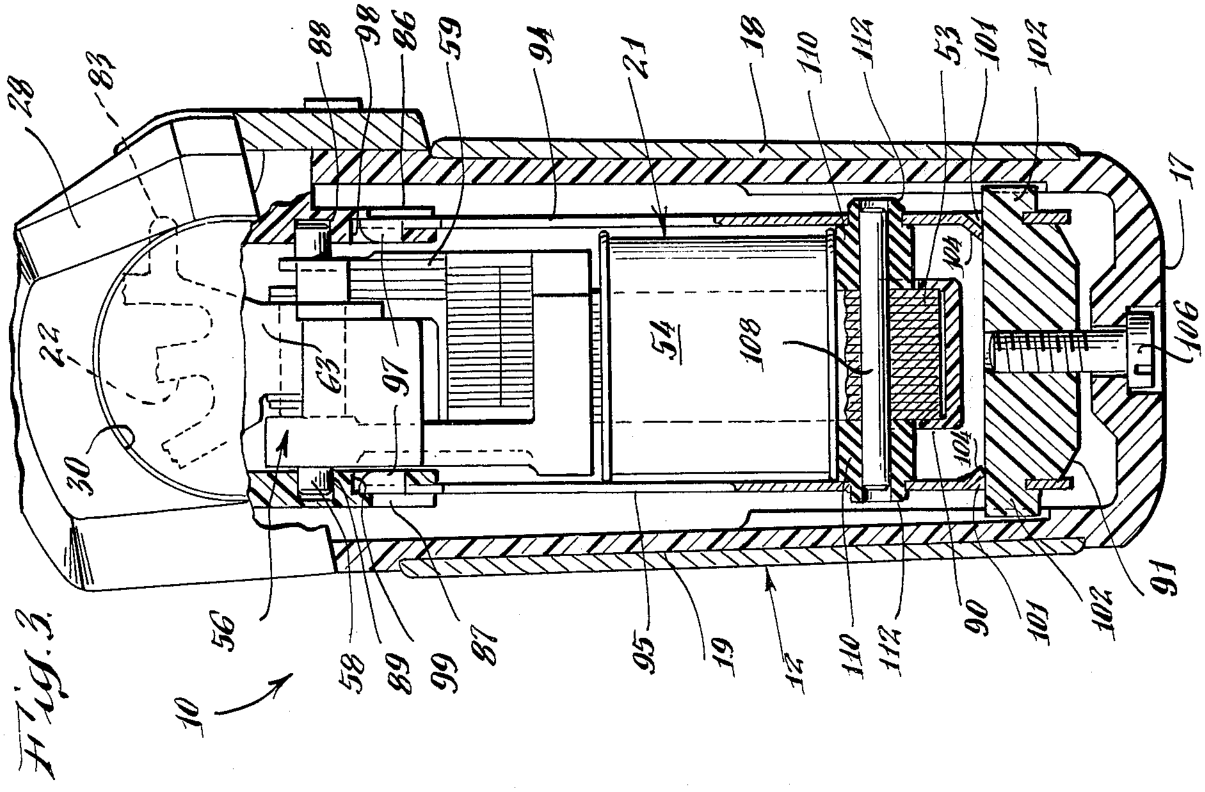
FIG. 3 is a side elevational view of the shaver of FIG. 1 with portions of the shaver casing broken away to show the interior portions thereof.

As seen in FIGS. 3 and 4 motor 21 is of the vibratory type and includes a U-shaped stator assembly 53 comprising a plurality of closely stacked U-shaped laminations. Coil members 54 are provided about the opposite legs of stator 53 in the usual manner. An armature assembly 56 comprises closely stacked laminations and which assembly is pivotly mounted about a shaft 58 carried by a support plate assembly 59. Support plate 59 is provided with a lower portion to which is secured the stator assembly 53 in a suitable manner. In addition armature springs 60 are disposed within support 59 and have one end engaging support 59 with the opposite ends thereof engaging the armature assembly 56 in a usual manner to establish a desired degree of entry between the armature pole faces 61 and the stator pole faces 62 so that upon energization of coils 54 armature 56 vibrates in a selected cycle relative to the stator assembly 53. Oscillator arms 22 comprise extensions of a member 63 (FIG. 3) secured to armature shaft 58 and adapted to vibrate in unison with armature assembly 56 to effect movement of inner cutters 48 as oscillator arms 22 engage drive leaf springs 50 in a usual manner.

Figure 6:
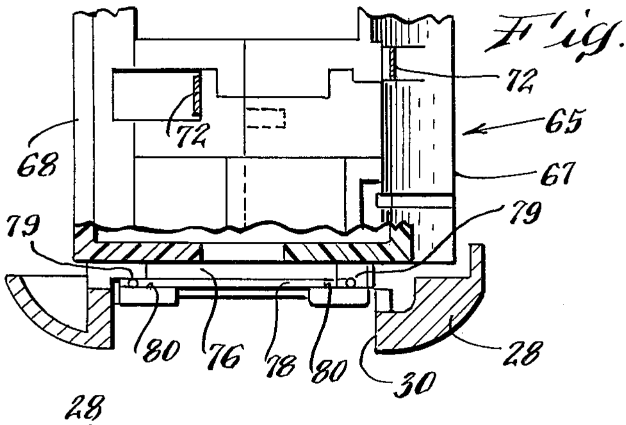
FIG. 6 is a sectional view taken on the lines 6—6 of FIG. 5.
Figure 10:
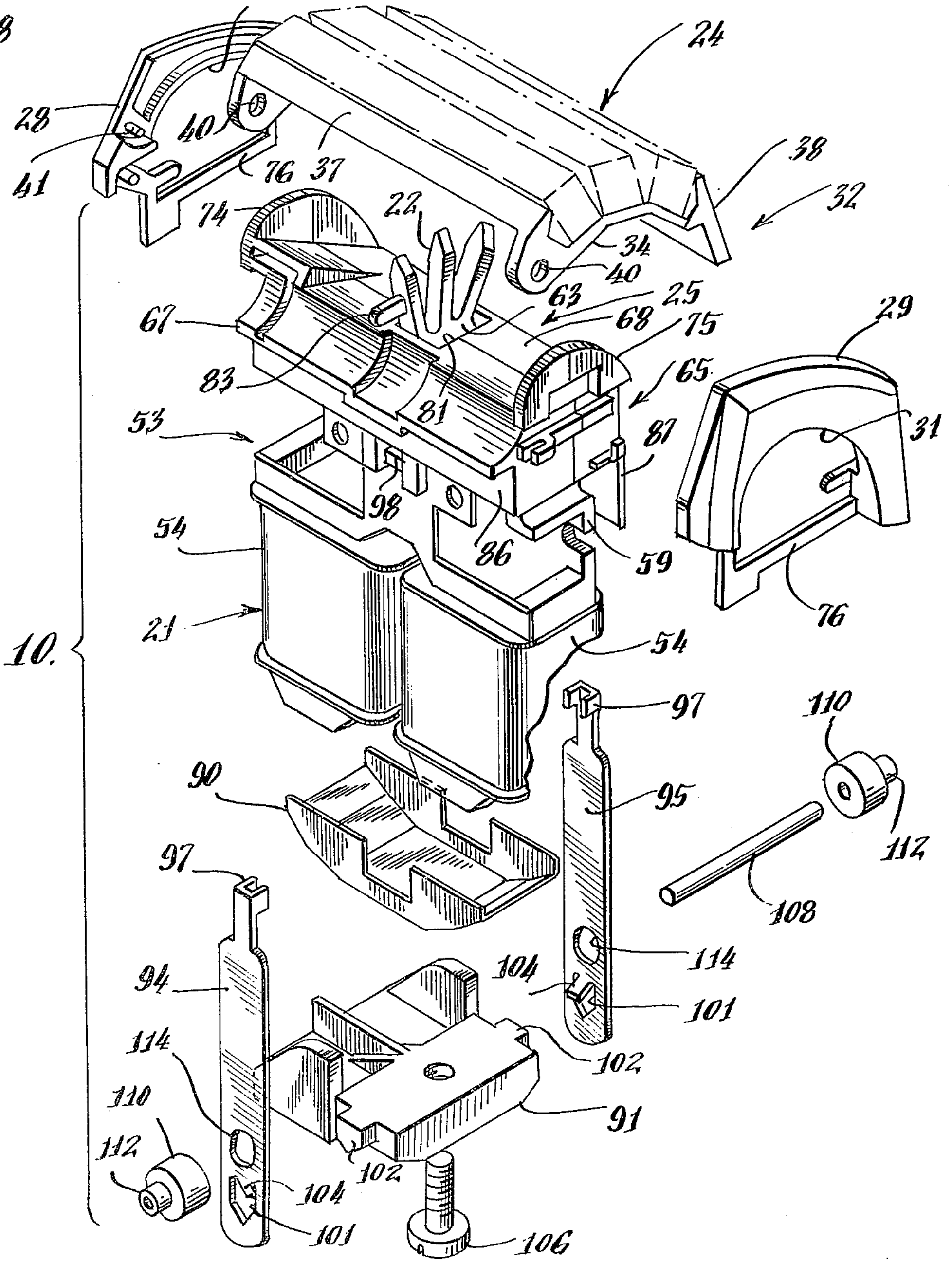
FIG. 10 is an exploded view of certain of the operative parts of the appliance and the shroud support.

As mentioned it is a feature of the present invention to provide a novel structural arrangement for mounting the operative portions of the electric dry shaver i.e., cutter head assembly 24, motor 21 and the drive means 22, 63 therefor within casing 12 whereby the same is drawn from the casing 12 in assembled operative condition. To this end a support assembly which comprises a shroud member generally indicated by the reference numeral 65 in FIGS. 6 and 10 is arranged for supporting the aforementioned operative elements of shaver 10.

Figure 5:
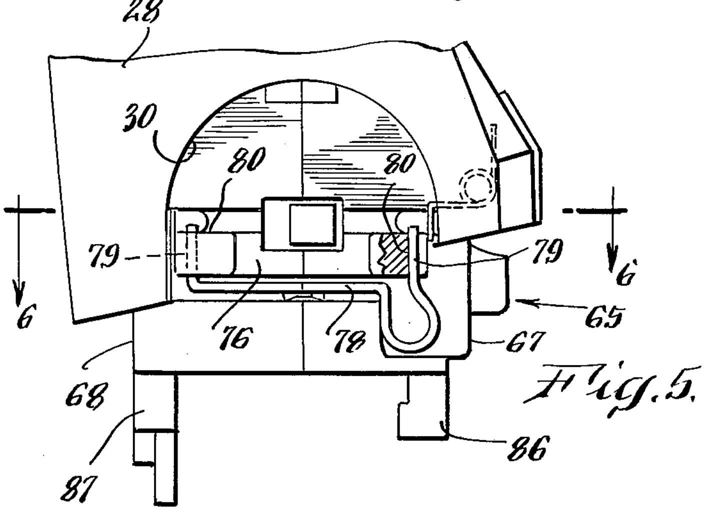
FIG. 5 is a fragmentary end view of the shroud assembly.
Figure 7:
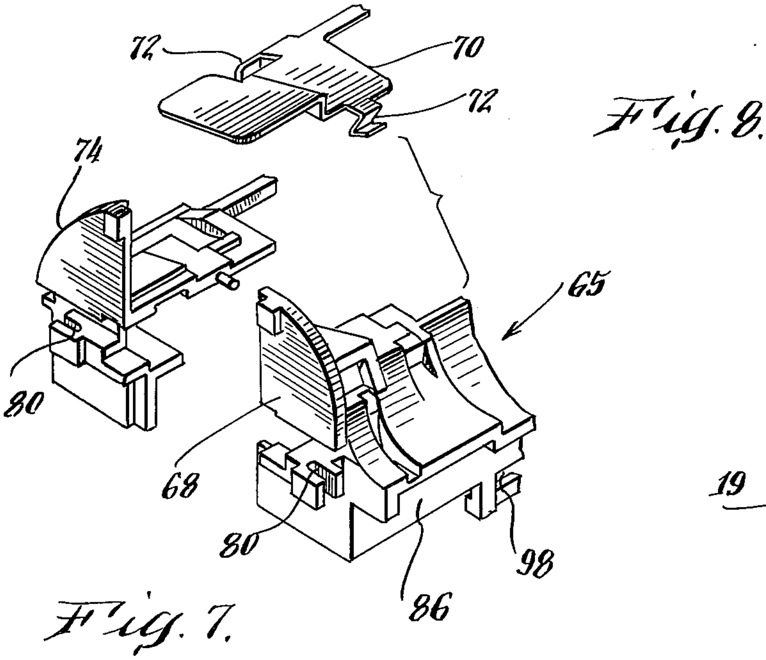
FIG. 7 is a fragmentary exploded perspective view of the one end of the shroud assembly.
Figure 8:
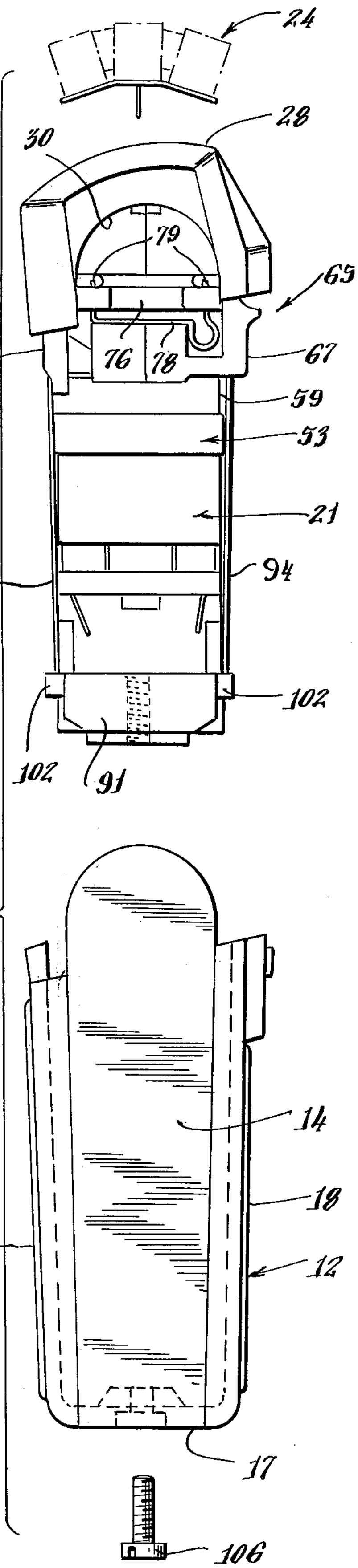
FIG. 8 is a side elevational view showing the operative assembly of the shaver removed from the enclosure casing.
Figure 9:
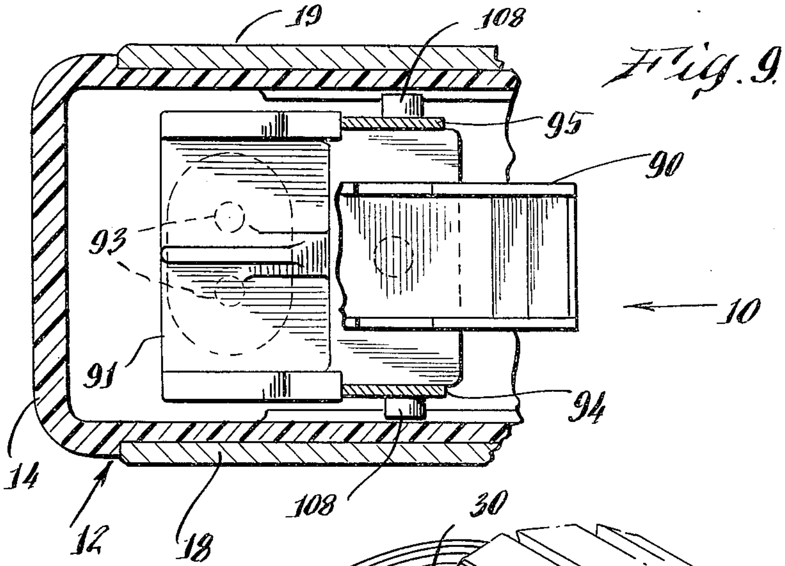
FIG. 9 is a sectional view taken on the line 9—9 of FIG. 4.

Shroud assembly 65 includes a pair of mating support sections 67 and 68 formed of a molded plastic material. In mated engagement as seen in FIGS. 2, 6 and 7, spring clamps 70 having leg portions provided with detents 72 are disposed on the upper surface of the mated sections with the detents lying in cut-out portions of the engaged sections to secure the sections together. The opposite end portions 74 and 75 of shroud 65 comprise arcuate raised portions (FIG. 10). As shown in FIG. 5 with respect to one end 74 end pieces 28, 29 are fitted over arcuate portions 74, 75. The lower portion of end pieces 28–29 are provided with bridging straps 76 which lie against the surface of shroud 65. Detachable clips 78 (as shown in FIGS. 5, 6 and 8) are provided having opposite legs 79 fitted in notches 80 in sections 67 and 68 and which legs 79 in locked position maintain its associated end piece 28 or 29 securely locked to shroud 65.

As previously mentioned cutter head support section 32 is hinged to end pieces 28–29 and an opening is provided in shroud 65 to allow oscillator arms 22 to enter through appropriate aligned openings in wall 34 and the cutter head assembly 24 to engage the inner cutters 48 in the manner previously described. In addition one oscillator arm 22 as seen in FIGS. 3 and 10 is provided with a projection 83 for operating a trimmer assembly generally indicated by the reference numeral 84 in FIG. 1 which is also carried by the end pieces 28, 29 (in a manner not shown) and which assembly includes cutter means for operative engagement with extension 83 as desired.

Means are also provided for suspending motor assembly 21 from shroud 65 and which means include downwardly extending wall portions 86 and 87 of sections 67 and 68. Aligned openings 88 and 89 are formed in depending portions 86 and 87 (FIG. 3) and in which openings are arranged the opposite ends of shaft 58 of armature assembly 56 to position the motor support 59 relative to shroud 65. The opposite or lower end of motor 21 (FIGS. 3 and 4) is disposed within an end cup 90 of insulated plastic material. End cap or bell 90 fits over and is attached to lower portion of stator assembly 53 with end cup notches 92 adjacent to rubber caps 110 for movement therewith.

Terminal block 91 is provided with means for mounting thereon appropriate terminals for wire connections (not shown) to coils 54 of stator assembly 53. An extension of terminal block 91 is provided with input terminals 93 (FIG. 4) arranged in a bottom wall portion 17 of casing 12 for connection by means of a usual power electrical cord to a suitable household outlet for energization of motor 21.

Interconnecting means are provided to connect terminal block 91 to shroud 65 and which means comprise a pair of metal strap members 94 and 95 respectively. The upper ends (FIGS. 3 and 4) of straps 94 and 95 are provided with bent tabs 97 which are press fitted into openings 98 and 99 of wall portions 86 and 87 of shroud 65. The lower ends of straps 94–95 are provided with openings 101 which are in turn arranged over bosses 102 of terminal block 91 to lock straps 94–95 thereto. In addition fingers 104 extend from openings 101 on straps 94–95 to engage terminal block 91 to further detent the straps 94–95 thereto.

As will now be appreciated from the described structure all operative parts of the shaver are secured to shroud assembly 65. The assembled parts are maintained within the enclosure 12 by a threaded fastening member 106 which extends through bottom wall 17 of casing 12 into locking engagement with block 91. The removal of fastener 106 as seen in FIG. 8 will allow the assembled operative portions of the shaver to remove as an assembled unit from shaver casing 12.

As mentioned it is a further feature of this invention to provide means for the lower end of the motor 21 to swing in a predetermined arc to absorb vibrations in a manner whereby less vibrations are transmitted from the motor to the walls of enclosure casing 12. As seen in FIGS. 3 and 4 the lower portion of stator assembly 53 is provided with a shaft 108 extending through the bight portion of the U-shaped laminations thereof. Rubber caps 110 are fitted over shaft 108 and are provided with a hub portion 112 disposed in slightly oversized eliptical slots 114 in strap members 94 and 95. Upon energization of motor 21 motor assembly will vibrate about shaft 58 with the vibrations absorbed in the rubber mounting caps 110 allowing for a more quieter motor with fewer vibrations transmitted to the casing walls.

It will be apparent from the foregoing description that the novel electric dry shaver has many advantages in use. One advantage among others is that the novel shroud arrangement 65 allows means for mounting operative portions of the appliance for removal as an operative unit from the enclosure casing. Among further advantages it is a novel means for mounting the motor in a manner where the vibrations transmitted to the casing walls are greatly reduced. The simplified parts and assembly arrangements further reduces the cost of manufacturing both in labor and other expenditures. As will be further apparent although the embodiment described is directed to an electric dry shaver the invention is not limited thereto and has applicability of other portable electrical appliances having a motor for operating a driven output means.

It is to be expressly understood that the invention is not limited to the embodiment illustrated and described. Various changes can be made in the design and arrangement of parts without departing from the spirit and scope of the invention as the same will be readily understood by those skilled in the art.

We claim:

1. In a portable electrical appliance, a. a casing, b. a shroud assembly disposed adjacent one end of the casing, c. a motor assembly having a stator and a pivotally mounted armature for driving an output means, d. means suspending the motor assembly from the shroud assembly, said suspending means providing a pivot for the motor assembly, the motor assembly moves about the pivot in an arcuate path upon energization of the motor assembly, e. a block assembly disposed adjacent the other end of the casing and secured thereto, f. means interconnecting the block assembly to the shroud assembly, and g. dampening means engaging said interconnecting means to dampen said arcuate movement of the motor assembly in the operation of the motor assembly.

2. The appliance of claim 1 wherein said dampening means include projections provided on said motor assembly for engagement with said interconnecting means.

3. The appliance of claim 2 wherein said interconnecting means include straps having oversized openings within which said projections are arranged.

4. The appliance of claim 3 wherein resilient material is provided within said oversized openings.

5. The appliance of claim 1 wherein said interconnecting means include straps detachably securing said block assembly to the shroud assembly and wherein said motor assembly is suspended for said arcuate movement between said straps.

6. The appliance of claim 5 wherein said straps include tabs at one end thereof secured to depending wall portions of said shroud assembly, and said straps further including an aperture adjacent the opposite end of said straps having a surface adapted for mated engagement with a detent projection on said block assembly.

7. The appliance of claim 6 wherein said strap further includes fingers adjacent said aperture adapted for engagement with said block assembly to further detent said strap to the block assembly.

8. The appliance of claim 1 wherein said block assembly includes terminal means for electrical connection of the motor assembly to a suitable source of electric power to permit energization of said motor assembly.

9. A support assembly for the operative elements of an electric dry shaver arranged within an enclosure casing comprising, a. a shroud assembly seated on said enclosure and from which shroud assembly is suspended a vibratory motor, b. a cutter head assembly and drive means therefor supported by said shroud assembly, c. a support block spaced from said shroud assembly and arranged at the base of the enclosure, d. means interconnecting said shroud assembly to said support block and including portions for positioning one end of the motor, e. means for releasably securing said support block to said casing, f. said shroud assembly including a pair of mated sections between which is held the opposite end of the motor, g. said means interconnecting said shroud assembly to said support block including a pair of strap members having opposite ends detachably secured to said support block and to said shroud assembly, h. said straps are provided with oversized openings in which are arranged the opposite ends of a shaft within the stator of said vibratory motor, and i. resilient material is provided about the ends of said shaft to absorb vibrations in operation of the motor.

10. The support assembly of claim 9 wherein said one end of the motor is positioned within an insulated cap member having slots adjacent said resilient material for movement therewith.

* * * * *